US011871196B2

(12) United States Patent
Neerbek et al.

(10) Patent No.: US 11,871,196 B2
(45) Date of Patent: Jan. 9, 2024

(54) AUDIO ENHANCEMENTS BASED ON VIDEO DETECTION

(71) Applicant: Roku, Inc., San Jose, CA (US)

(72) Inventors: Jan Neerbek, Aarhus (DK); Kasper Andersen, Aarhus (DK); Brian Thoft Moth Møller, Aalborg (DK)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/721,711

(22) Filed: Apr. 15, 2022

(65) Prior Publication Data

US 2022/0240013 A1 Jul. 28, 2022

Related U.S. Application Data

(63) Continuation of application No. 16/697,744, filed on Nov. 27, 2019, now Pat. No. 11,317,206.

(51) Int. Cl.
*H04R 3/12* (2006.01)
*H04S 3/00* (2006.01)
(Continued)

(52) U.S. Cl.
CPC ................. *H04R 3/12* (2013.01); *H04R 5/02* (2013.01); *H04R 5/04* (2013.01); *H04S 3/008* (2013.01); *H04S 7/302* (2013.01); *H04S 2400/01* (2013.01)

(58) Field of Classification Search
CPC ...... H04N 23/00; H04N 23/61; H04N 23/661; H04N 23/695; H04N 7/18; H04N 7/181;
(Continued)

(56) References Cited

U.S. PATENT DOCUMENTS 9,294,848 B2 3/2016 Barthel et al.
9,602,940 B2 1/2017 Bharitkar et al.
(Continued)

FOREIGN PATENT DOCUMENTS

KR 10-2010-0066826 A 6/2010

OTHER PUBLICATIONS

Jan Neerbek, et al., "Detecting Complex Sensitive Information via Phrase Structure in Recursive Neural Networks," Springer Int'l Pub'g AG, part of Springer Nature 2018, D. Phung et al., eds., Pacific-Asia Conference on Knowledge Discovery & Data Mining (PAKDD) 2018, Lecture Notes in Artificial Intelligence (LNAI) 10939, pp. 373-385 (2018). https://link.springer.com/chapter/10.1007/978-3-319-93040-4_30.
(Continued)

*Primary Examiner* — Lun-See Lao
(74) *Attorney, Agent, or Firm* — Sterne, Kessler, Goldstein & Fox P.L.L.C.

(57) ABSTRACT

Disclosed herein are various embodiments for implementing audio enhancements based on video detection. An embodiment operates by receiving an audio clip corresponding to a video clip to be output simultaneously. A background of the video clip is detected. It is determined that the audio clip is to be output with one of wet sounds or dry sounds based on the detected background of the video clip. The audio clip is configured to enhance the determined one of wet sounds or dry sounds when the audio clip is output. The configured audio clip is provided to the audio output device to audibly output the configured audio clip with the enhanced wet sounds or dry sounds when the video clip is output.

20 Claims, 7 Drawing Sheets

100

(51) Int. Cl.
*H04R 5/02* (2006.01)
*H04R 5/04* (2006.01)
*H04S 7/00* (2006.01)

(58) Field of Classification Search
CPC ...... H04N 7/188; H04R 2499/13; H04R 3/12; H04R 5/02; H04R 5/04; H04S 1/002; H04S 1/005; H04S 2400/11; H04S 2420/01; H04S 2420/03; H04S 3/002; H04S 3/004; H04S 2400/01; H04S 3/008; H04S 7/302; H04S 7/305; H04W 4/00; G06V 20/52; G06V 20/59
USPC ................................ 381/303, 56–58; 700/94
See application file for complete search history.

(56) References Cited

U.S. PATENT DOCUMENTS

| | | | | |
|---|---|---|---|---|
| 9,729,992 | B1 | 8/2017 | Holman | |
| 10,130,884 | B1 * | 11/2018 | Friedman | G07F 17/3225 |
| 10,158,960 | B1 * | 12/2018 | Møller | H04R 5/02 |
| 10,931,909 | B2 * | 2/2021 | Curtis | H04R 5/04 |
| 10,958,301 | B2 * | 3/2021 | Curtis | H04B 1/7087 |
| 10,992,336 | B2 | 4/2021 | Curtis et al. | |
| 11,317,206 | B2 | 4/2022 | Neerbek et al. | |
| 2008/0112574 | A1 | 5/2008 | Brennan et al. | |
| 2009/0003613 | A1 | 1/2009 | Christensen | |
| 2009/0125961 | A1 | 5/2009 | Perlman et al. | |
| 2010/0066826 | A1 | 3/2010 | Munch | |
| 2011/0153043 | A1 * | 6/2011 | Ojala | H04S 3/002 700/94 |
| 2013/0322348 | A1 | 12/2013 | Julian et al. | |
| 2014/0173437 | A1 * | 6/2014 | Pugh | G11B 27/034 715/723 |
| 2014/0298260 | A1 * | 10/2014 | Abowd | G06F 3/04842 715/810 |
| 2016/0021430 | A1 | 1/2016 | LaBosco et al. | |
| 2016/0196108 | A1 | 7/2016 | Selig | |
| 2017/0257414 | A1 * | 9/2017 | Zaletel | H04L 65/764 |
| 2018/0302738 | A1 | 10/2018 | di Censo et al. | |
| 2019/0108856 | A1 * | 4/2019 | Shore | G11B 27/34 |
| 2022/0138276 | A1 * | 5/2022 | Xin | H04W 12/08 455/456.3 |

OTHER PUBLICATIONS

Jan Neerbek, el al., "Selective Training: A Strategy for Fast Backpropagation on Sentence Embeddings." Springer Nature Switzerland AG 2019. Yang el al., eds., Pacific-Asia Conference on Knowledge Discovery and Data Mining (PAKDD) 2019, Lecture Notes in Artificial Intelligence (LNAI) 11441, pp. 40-53 (2019). https://link.springer.com/chapter/10.1007/978-3-030-16142-2_4.

International Search Report and Written Opinion from International Application No. PCT/US2020/061012, dated Mar. 19, 2021 (9 pages).

F.J. Pompei, "Fundamental Limitations of Loudspeaker Directivity," Holosonics (archived Jul. 8, 2017), archived at https://web.archive.org/web/20170708123241/https://www.holosonics.com/fundamental-limitations-of-loudspeaker-directivity/ (14 pages).

* cited by examiner

500

700

AUDIO ENHANCEMENTS BASED ON VIDEO DETECTION

CROSS-REFERENCE TO RELATED APPLICATIONS

This application is a continuation of U.S. patent application Ser. No. 16/697,744, titled "Sound Generation with Adaptive Directivity", filed Nov. 27, 2019, which is related to U.S. patent application Ser. No. 16/133,817, titled "Identifying Audio Characteristics of a Room Using a Spread Code," filed Sep. 18, 2018, both of which are incorporated herein by reference in their entireties.

FIELD

This disclosure is generally related to sound generation for audio content, to improve listener experience by automatically adapting output characteristics of loudspeakers in various arrangements, and more specifically with directional sound.

BACKGROUND

Many audio playback configurations, including those of many home entertainment (e.g., cinema, gaming, etc.) setups, radio or television sets, and other home audio systems, cannot be adjusted easily, if at all, to tailor their acoustic properties to a given instance of content for playback, let alone for individual components or segments of that content. If users wish to adjust the acoustic properties of their equipment, manual intervention is usually required at some stage of production and/or playback, including hand-tweaking equalizer settings, browsing and selecting from predefined equalizer profiles (such as for a given genre of music, for example), manually repositioning physical loudspeaker elements, or other time-consuming tasks that require advanced knowledge and skill to carry out with desired results. Even if these conditions are met for one content instance, adjustments may need to be repeated from scratch to suit a different content instance. Similarly, within a given content instance, different adjustments may need to applied during playback of the same content instance.

While surround-sound systems and sound-reinforcement systems can upmix multi-channel audio signals using passive filters and static rules for fixed loudspeakers, sound-quality improvement may be limited for certain types of audio content. Thus, even professional audio installations of conventional high-fidelity audio playback equipment configured by acoustical engineers cannot be optimized for all content at all times. Rather, settings must be narrowly specialized, or else compromises must be made for general use.

SUMMARY

Disclosed herein are system, apparatus, device, method and/or computer-readable storage-medium embodiments, and/or combinations and sub-combinations thereof, for audio enhancements based on video detection.

In some embodiments, an audio signal is received, the audio signal corresponding to a video clip to be output simultaneously. A background of the video clip is detected. It is determined that the audio clip is to be output with one of wet sounds or dry sounds based on the detected background of the video clip. The audio clip is configured to enhance the determined one of wet sounds or dry sounds when the audio clip is output. The configured audio clip is provided to the audio output device to audibly output the configured audio clip with the enhanced wet sounds or dry sounds when the video clip is output.

Other embodiments, features, and advantages of the invention will be, or will become, apparent to one with skill in the art upon examination of the following drawings/figures and detailed description. It is intended that all such additional embodiments, features, and advantages be included within this description, be within the scope of this disclosure, and be protected by the claims that follow.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer-readable storage-medium embodiments, and/or combinations and sub-combinations thereof, for sound generation with adaptive directivity.

Figure 1:
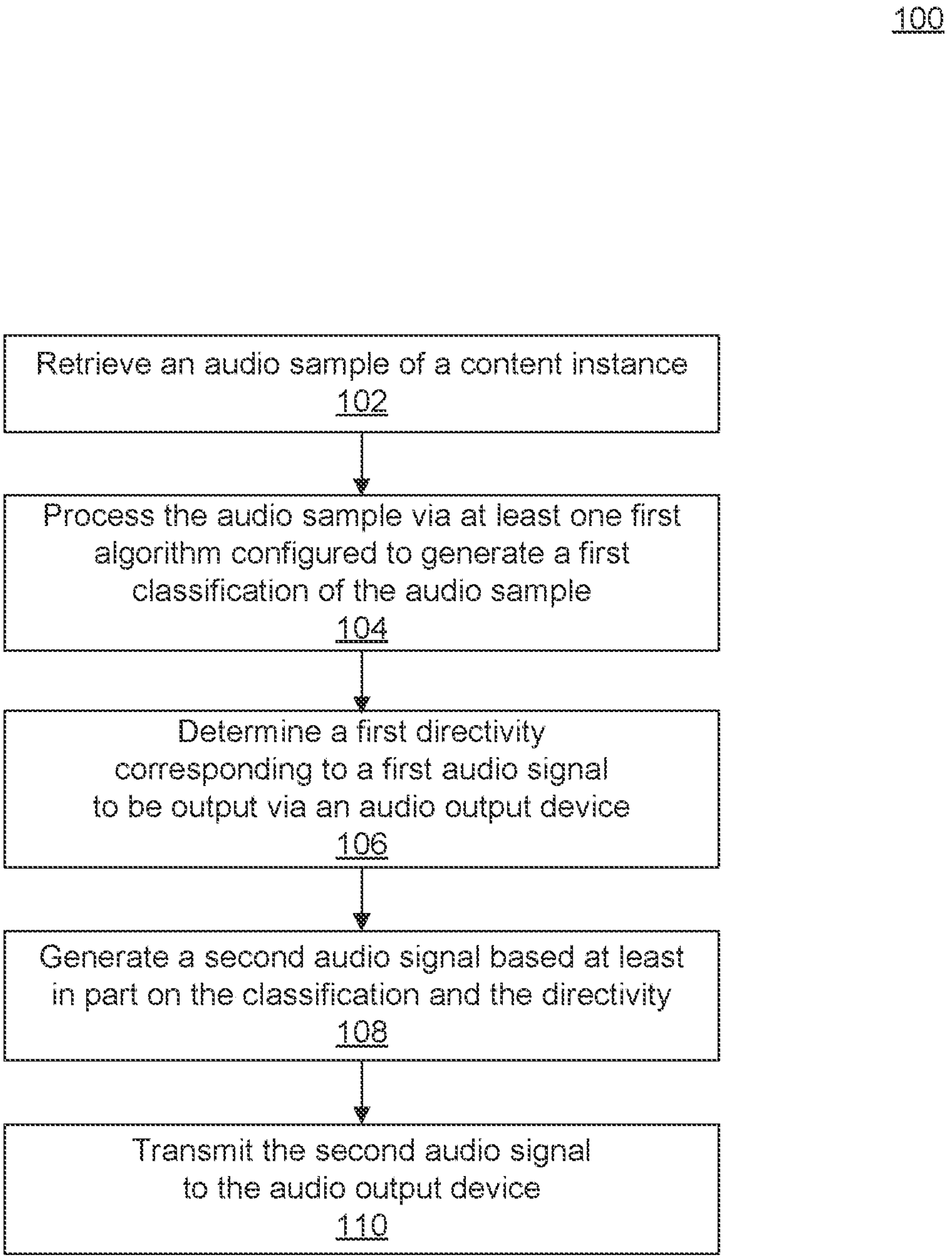
FIG. 1 is a flowchart illustrating a method implementing some of the enhanced techniques described herein, according to some embodiments.

FIG. 1 is a flowchart illustrating a method 100 implementing some of the enhanced techniques described herein, according to some embodiments. Method 100 may be performed by processing logic that may comprise hardware (e.g., circuitry, dedicated logic, programmable logic, microcode, etc.), software (e.g., instructions executing on a processing device), or a combination thereof. Not all steps of method 100 may be needed in all cases to perform the enhanced techniques disclosed herein. Further, some steps of method 100 may be performed simultaneously, or in a different order from that shown in FIG. 1, as will be understood by a person of ordinary skill in the art.

Method 100 shall be described with reference to FIGS. 1, 2, and 7. However, method 100 is not limited only to those example embodiments. The steps of method 100 may be performed by at least one computer processor coupled to at least one memory device. An exemplary processor and memory device(s) are described below with respect to FIG. 7. In some embodiments, method 100 may be performed by components of system 200 of FIG. 2, which may further include at least one processor and memory such as those of FIG. 7.

In 102, at least one processor 704 may be configured to retrieve an audio sample of a content instance. In some embodiments, the content instance may be a collection of audio data from a file or stream, for example. The content instance may be stand-alone audio (e.g., music, speech, ambient or bioacoustical recordings, telephony, etc.) or a soundtrack to accompany video playback (e.g., television or motion pictures), interactive multimedia (e.g., video games or virtual reality), or other multimedia presentations.

An audio sample may refer to a subset of audio data of a given content instance. The length of the audio sample may be specified in a manner sufficient to allow an algorithm to classify the audio sample among a given set of classes (also referred to as categories, labels, or tags, for example), and within a desired confidence level.

The algorithm may include any number of steps or subsidiary algorithms within it, and may manipulate any kinds of data structures as inputs, outputs, or intermediate values, for example. More details about the algorithm are described further below with respect to 104 and elsewhere in this disclosure.

Reduced audio sample length may result in tradeoffs, such as lower accuracy or more complex algorithms for classification, for example. Conversely, while longer audio samples may yield higher accuracy of classifications, in some embodiments, processing of longer samples may require additional processing times. Depending on applications of the classification, speed of processing may be prioritized above algorithmic simplicity or accuracy of classification, in some cases, thus resulting in shorter audio sample lengths. In some embodiments, audio sample lengths may be dynamically adjusted depending on available processing resources, time constraints, other known factors (e.g., classifications of other aspects of the content instance, such as an associated video track or genre tag), randomization, environmental factors of a processing device and/or playback device, or user input, for example.

Thus, depending on desired confidence level and number of available classes (size of the label space), the length of the audio sample may range from a fraction of a second to an arbitrary number of seconds. In an embodiment, accurate classification of an audio sample among at least one of six classifications to a 95% confidence level may dictate that audio samples be at least three seconds long.

Reducing the number of possible classes to two, and reducing the confidence level to 85%, classifications may be made with audio samples on the order of tens of milliseconds, in some embodiments. Shorter lead time for classifications may also improve initial sound quality, e.g., when turning on a content player, activating a content instance, changing a channel, etc., where a previous audio sample may not already be present or available for processing—waiting several seconds before applying an audio filter may create an uncomfortable effect for audience members, in some instances.

One or more audio samples may be classified such that an overall classification may additionally be made for the given content instance as a whole. Such an overall classification may depend on length of the audio samples with respect to length of the content instance as a whole, position of the audio samples within the content instance, other degree(s) of how representative an audio sample may be of the content instance as a whole, or a combination of these factors, among others, in some embodiments.

However, irrespective of such overall classifications and whether the overall classifications were made automatically by computerized classifiers or manually by human classifiers (e.g., a set classified by an expert listener, or crowd-sourced with survey questions or ratings prompts), any given audio sample on its own may be accurately classified with classes different from that of any overall classification, or different from classes of other audio samples in the same content instance. For example, a given music piece may excerpt (sample) other music tracks of different genres, but the given music piece may be assigned one overall genre, in some embodiments.

Alternatively, multiple overall genres may be assigned to the given music piece. In some embodiments, content instances may contain multiple audio elements (e.g., audio components, tracks, segments, instruments, sound effects, etc.) that may be parsed and separately classified according to at least one algorithm.

In 104, processor 704 may be configured to process the audio sample via at least one first algorithm configured to generate a first classification of the audio sample. To generate a classification, as used here, may be to classify (categorize) the audio sample, assigning the audio sample to one or more classes (categories, labels, tags, etc.).

Classification may be content-based—in a case of classifying audio samples, audio content of an audio sample may be analyzed. For example, shapes of waveforms, including time-wise progression of frequency, amplitude, dynamic range may be evaluated in a classification algorithm. In some embodiments, pattern recognition, speech recognition, natural-language processing (NLP), and other techniques may also be used in classification. An algorithm may employ any of various heuristics, neural networks, or artificial intelligence (AI) techniques, including machine learning (ML), and may further involve internal processing across a plurality of neural-network layers (deep learning).

Any ML techniques employed herein may involve supervised learning, unsupervised learning, a combination thereof (semi-supervised learning), regressions (e.g., for intermediate scoring, even if resultant output is a classification), reinforcement learning, active learning, and other related aspects within the scope of ML. Deep learning may apply any of the ML techniques described herein to a perceptron, a multi-layer perceptron (MLP) model, a hierarchical neural network, a recurrent neural network, a sequential encoder, a recursive neural network, a modular neural network, a feedforward neural network, or a memory network, to name a few non-limiting examples. Some cases of a feedforward neural network may, for example, further correspond to at least one of a convolutional neural network (CNN), a probabilistic neural network, a time-delay neural network, an autoencoder, or any combination thereof, in some embodiments.

Classification may include a binary classification of whether or not a certain audio characteristic is present in a complex waveform of a given audio sample. In contrast to identifying thresholds (e.g., frequencies below 20 Hz, dynamic ranges above 40 dB, etc.), some classifications may be made more effective and more efficient by using more complex filtering and sophisticated logic, AI, ML, etc., which may increase code size. In some embodiments, an audio characteristic may be a detected amount of reverberation or echo, which may be determined and/or filtered by neural-network techniques including by different AI or ML algorithms, for example.

Thus, to determine presence of reverberation (reverb) and/or echo in a given audio sample, a direct mathematical evaluation of the waveform may be excessively burdensome given limited computing resources. But application of ML, such as using at least one autoencoder to function as a classifier may streamline computational efficiency of determining whether or not reverb is present in a given audio sample, for example.

Such a binary classification may be useful in determining whether a given waveform corresponds to a "wet sound" or a "dry sound" as described in acoustical terms. Wet sounds include residual patterns from echoes and/or reverberations, such as from hard, reflective, and/or non-absorptive materials surrounding a location where wet sounds are observed or recorded, for example. By contrast, dry sounds may be described as having relatively little to no echo or reverberation. Because of this lack of echo or reverberation, sounds having high directivity are generally dry, whereas sounds having low directivity (omnidirectional sound) are generally wet, at least near any reflective surfaces. More information about directivity is described further below. More information about wet and dry sounds is also described herein with respect to FIGS. 3 and 4 below.

Further examples of classes, categories, labels, or tags, in some embodiments, may include genres of music. Thus, an algorithm may be able to generate a classification of a musical genre of an audio sample based on the content (e.g., waveform) of the audio sample, without relying on manual intervention by a human classifier, without relying on a database of audio fingerprints to cross-reference genres or other metadata, and/or without performing any other search based on metadata corresponding to an audio sample or to a content instance from which an audio sample has been derived.

As described above, a genre classifier may rely on additional inputs. These additional inputs may, in turn, be outputs of other classifiers. In some embodiments, a determination of whether a waveform is wet or dry may influence a classification of genre(s) corresponding to the waveform and its respective audio sample or content instance. For example, a classifier may be trained such that dry sounds have a relatively high probability of corresponding to classical music, whereas wet sounds may have a relatively high probability of corresponding to rock music, in some embodiments.

In 106, processor 704 may be configured to determine a first directivity, corresponding to a first audio signal to be output via an audio output device. Directivity is a function of sound energy—more specifically, directivity is a ratio of sound intensities. Sound intensity may be defined as a product of sound pressure and velocity of particles of a medium allowing transmission of sound waves. Equivalently, sound intensity may also be defined as sound power carried by sound waves per unit area, in a direction perpendicular to a given area. Sound power is a rate of sound energy per unit time.

Directivity may be measured by a directivity index or a directivity factor, in some embodiments. The directivity factor is a ratio of axial sound intensity, for sound waves along a given axis (of an audio output device, in this case), to mean omnidirectional sound intensity (emitted by the audio output device). A base-10 logarithm of the directivity factor may be referred to as a directivity index, expressed in units of bels. Either of the directivity index or directivity factor may be called a directivity coefficient, in some embodiments, and may apply to a loudspeaker array as a whole or to any loudspeaker element making up a given loudspeaker or loudspeaker array.

Analogizing sound directivity to electromagnetic radiation (e.g., light) directivity, where a candle emits near-omnidirectional light, a flashlight instead emits a focused beam of light having greater intensity within the beam than a corresponding omnidirectional light emission from the same light source (having the same energy). The flashlight therefore has a higher directivity than the candle. Sound waves may be directed similarly.

Determinations of directivity may be made by processor 704 in various ways. For example, with respect to audio output by an audio output device, at least one separate audio input device (e.g., microphone or similar transducer) may detect sound intensity on and off a given axis, to calculate at least a directivity factor. In some embodiments, processor 704 may use a known value of energy or power output from the audio output device as a reference value for determining directivity in any of the ways mentioned above. In further embodiments, waveforms or other audio signals may be analyzed and evaluated to determine values of audio characteristics (e.g., sound energy, sound power, sound intensity, etc.), which may be used as reference values in calculations based on any on- or off-axis values of comparable audio characteristics that may be measured or already stored, e.g., from predetermined values or from previous measurements. On-axis sound may be described as "forward" sound with respect to a loudspeaker element.

In some embodiments, processor 704 may, based at least in part on an audio input device and/or processing of an audio sample of a content instance, including determining a directivity of an audio signal, generate instruction(s) to a human user to indicate to the user how to reposition audio output device(s) or loudspeaker element(s) to improve sound quality in a given environment, for example. In some embodiments, processor 704 may redirect or reprocess (filter) sound output via at least one loudspeaker element, to compensate for suboptimal positioning of the at least one loudspeaker element.

Additionally, in some embodiments, sound output may be filtered and/or redirected, accounting for environmental factors (including reflective objects), in order to create acoustical illusion(s) of at least one additional loudspeaker element that is not physically present in any active audio output device, for example. Further techniques to realize these benefits are described herein in more detail with respect to other parts of this disclosure.

In some embodiments, audio output device may include at least one loudspeaker. More specifically, audio output device may be a single loudspeaker, or an array of a plurality of loudspeakers, for example. Any loudspeaker may be configured to adjust its orientation or attitude relative to a listener, another loudspeaker, or another stationary object.

For example, any loudspeaker in an array may be mounted on a movable or motorized platform that may be configured to rotate in response to an electronic or programmatic signal, e.g., by means of a servo or stepper motor. Loudspeakers may additionally be communicatively coupled with any number of amplifiers in any number of stages, which may be independent of other loudspeakers or shared in common with at least one other loudspeaker.

In an array of loudspeakers, any given loudspeaker element (e.g., driver, horn, etc.) may be configured along a straight plane (with multiple loudspeakers having parallel central axes), or may have at least one loudspeaker element oriented at a different angle (in a non-parallel plane) from at least one other loudspeaker element in the array. Thus, for an array of loudspeakers as an audio output device, directivity of the array may depend on position of each loudspeaker (relative position or separation), angles of loudspeaker axes, and sound power output of each loudspeaker in the array, for example. Additional examples of loudspeaker arrays are disclosed further below with respect to FIGS. 2A and 2B.

Similarly, perceived directivity (e.g., by an audio input device or listener) may depend additionally on any reflective surfaces in the audible vicinity of the audio output device, and any separation of audio input devices relative to the audio output device (e.g., a pair of ears, binaural recording, etc.). Accordingly, for an audio output device with relatively few loudspeaker elements, or even for a single loudspeaker, perceived directivity may vary depending on factors external to the audio output device. Perceived directivity may be intentionally varied or modulated, for example, by motorized placement of loudspeaker elements, reflective surfaces, directional elements, etc., as described herein.

In 108, processor 704 may be configured to generate a second audio signal, based at least in part on the classification of the audio sample and the directivity determined in 106. For example, such a second audio signal may be used for intentionally varying perceived directivity of another audio signal, instead of, or alongside, any other technique(s) described elsewhere herein. In some embodiments, to generate the second audio signal, processor 704 may be configured to apply at least one filter to the first audio signal.

For example, to apply a filter may include performing a convolution of the first audio signal with a detected echo that may correspond to the first audio signal, or computing a deconvolution as the inverse of a convolution. Convolution of a signal with its echo may introduce a reverberation effect, making the resultant output signal more of a wet sound output. Conversely, deconvolution may effectively remove some reverberation, echo, or similar effects, which may accordingly result in more of a dry sound output.

As described elsewhere herein, a low directivity be correlated with an audio signal corresponding to a wet sound, for example, and that a high directivity may be correlated with an audio signal corresponding to a dry sound. In some embodiments, a second audio signal may be generated by computing a convolution of a first audio signal in response to a determination that the first audio signal has a high directivity or is a dry sound, for example.

The resulting second audio signal may be characterized as having a lower directivity than the first audio signal, and may thus be an audio signal characterized by a "wetter" sound based on the first audio signal. Some embodiments may include a reverse operation with a deconvolution in response to a determination that the first audio signal is wet or has a low directivity, for example.

In some embodiments, a filter may be a reference signal of a horizontal contour response corresponding to a known directivity (e.g., left or right of a center axis of an audio output device), and application of this filter may include performing a convolution of the first audio signal with this filter, for example. By applying such a filter, processor 704 may effectively change the directivity of the first audio signal to a second audio signal having a different directivity, without requiring physical repositioning of any loudspeaker in a room or in an array of speakers.

A further example of adjusting directivity in this manner may be configuring processor 704 to set a new directivity (or change an existing directivity) of a given audio output device, in response to determining that there is a change or difference between an existing directivity coefficient and a previous directivity coefficient for the same audio output device, e.g., if a genre of a content instance changes such that the perceived directivity changes, as may be measured at an audio input device, in some embodiments.

Additionally, or alternatively, a change or difference between an existing directivity coefficient and a previous directivity coefficient for the same audio output device may trigger setting the new directivity in response to the difference exceeding a predetermined threshold, for example.

In further embodiments, the new directivity may be set in response to a change in a detected classification of a content instance, including a change to having any classification instead of no classification (e.g., for initialization, turning on a content player, changing a content channel, etc.).

Additionally, or alternatively, processor 704 may send a signal to a servo or stepper motor, for example, to adjust a physical positioning of at least one loudspeaker element with respect to another loudspeaker element, e.g., in a room or in an array of loudspeaker elements, changing directivity of an output audio signal, in some embodiments. Similarly, processor 704 may change a given audio signal to one loudspeaker element in a loudspeaker array with respect to another audio signal to another loudspeaker element in the loudspeaker array, thereby changing the directivity (effectively rotating or translating an axis) of the loudspeaker array as a whole.

In some embodiments, a filter may include at least one impulse response function. For example, a filter may be a finite impulse response (FIR) filter or an infinite impulse response (IIR) filter. Filters may be for inputs or outputs that are continuous or discrete, analog or digital, causal or non-causal, and may comprise any type of transforms in the time domain or frequency domain. Filters may be applied as a part of or in conjunction with additional acoustic adjustments, e.g., for room modes, architectural acoustics, spatial audio rendering, including surround sound, wave field synthesis, psychoacoustic sound localization, and any combination of related techniques.

Processor 704 may be configured to apply a filter or any combination of filters having any of the above properties, to provide a few non-limiting examples above—other iterations, combinations, permutations, and equivalent functionalities may also be used within the scope of this disclosure. Filters may be implemented, in some embodiments, as stand-alone circuits or executable software programs, pluggable hardware modules or software functions, e.g., in libraries, or other implementations of signal-processing algorithms, for example.

In addition to, or instead of, any filter application or signal generation based on audio characteristics of a first audio signal, for example, a context of the first audio signal (other than a property of the first audio signal by itself) may influence or determine a second audio signal when it is generated by processor 704 in 108. For example, in an instance of audiovisual content (e.g., motion picture or television show), a given sample of a first audio signal may correspond with a simultaneous video clip (e.g., a sequence of images queued to be displayed by a playback device at the same time as when the first audio signal is queued for playback by the playback device).

In some embodiments of 108, a second audio signal may be generated by processor 704 based on content of the simultaneous video clip, as context for the first and second audio signals. For further context, processor 704 may further evaluate video content positioned in time before or after the simultaneous video clip. Additionally. or alternatively, for further context, processor 704 may further evaluate audio content positioned in time before or after the given sample of the first audio signal, for example.

Processor 704 may automatically determine content of a video clip applying any number of algorithms that may perform image recognition, edge detection, object classification, facial recognition, pose estimation, motion tracking, energy detection, video pattern recognition, heuristic calculation, regression, classification, or other techniques useful to determine content of images or video clips. An algorithm for these use cases may employ any of various heuristics, neural networks, or AI techniques, including computer vision and/or ML, and may further involve deep learning.

An example use case of detecting video content for audio context may include detection of video images depicting an explosion, which may be characterized by a sudden increase in luminosity and/or colors of a given range of color temperatures or color values, for example, and which may be in certain shapes. Additionally. or alternatively, explosion sounds may be detected via audio characteristics or signatures, including patterns of noise, frequency responses, sudden increases in volume or dynamic range, change in phase structure (e.g., via recursive neural networks), etc. Upon detection of explosion imagery or sound effects, such as by processor 704 applying computer vision and AI techniques, for example, processor 704 may also, in turn, generate an audio signal that may enhance listening viewer's perception of the explosion when audiovisual content corresponding to the explosion recorded therein is played back.

For example, to create a perception of a larger sound volume, processor 704 may configure an audio output device to emit wet sounds, applying directionality filter(s) and/or arranging loudspeaker element(s) to increase echo and/or reverberation. Additionally, or alternatively, dynamic bass boost and/or low-pass filter(s) may be applied to enhance bass response, as another enhancement of explosion perception to create deep sound with more powerful vibration.

Sound quality may be adjusted by processor 704 based on background detection or scene detection, as well, which may also utilize computer vision algorithms. For example, detection of an outdoor setting in plains, e.g., sky, horizon, and flat, grassy land, may cause processor 704 to adjust audio signals and resultant outputs to produce dry sounds based on the audio signals, because such settings are naturally dry (acoustically) in that few to no surfaces allow faithful reflection of sound waves.

If a sound played back from an audio device were wet with respect to scenery simultaneously displayed, audience perception may be skewed, and the audiovisual content may be less believable to the audience, disrupting suspension of disbelief and diminishing user experience. By contrast, unlike outdoor plains imagery, video depicting scenes in sparse rooms, gymnasiums, concert halls, etc., may lead viewers to expect to hear wet sounds more than dry sounds. In this case, processor 704 may adjust the resultant audio output accordingly.

Another example use case of detecting video content for audio context may include, e.g., use of speech recognition, facial recognition, or a combination thereof, to perform detection of video images depicting a talking head or an on-screen personality directly addressing the viewing audience (e.g., in an aside, monologue, commercial, promotion, etc.).

In this context, the viewing audience may generally expect the sound to be dry sound, such that the person speaking in the video appears to be speaking directly to the viewer who is listening. On the other hand, wet sound may make the speaker appear unnatural or impersonal, for example.

Thus, upon automatic detection of a talking speaker addressing the viewing audience, processor 704 may configure an audio output device to emit wet sounds, applying directionality filter(s) and/or arranging loudspeaker element(s) to decrease echo and/or reverberation. Additionally, or alternatively, equalizer settings other filtering may be applied to enhance audience perception of speech in a given context, in some embodiments.

Conversely, if processor 704 detects speech in an audio signal and does not detect talking characters in simultaneous video content, processor 704 may infer that the speech corresponds to a narrator. In the case of narration, listeners (viewing audience) may prefer more reverberation (wet sound) for the narrator's voice rather than less, and processor 704 may configure an audio output device accordingly.

In some embodiments, audience preferences on sound quality may be crowd-sourced, for example, by polling listening viewers regarding how a given sound (e.g., narration voice, background sound, special sound effect, overall audio quality, etc.) is perceived, and processor 704 may adjust target filters to produce outputs accordingly. Processor 704 may poll audience members automatically in response to detecting certain audio or video content, in some embodiments, further improving efficiency of crowd-sourcing operations from perspectives of content administrators, for example. Such crowd-sourcing may also provide additional training. e.g., for supervised ML, thus providing measurable feedback and further improvement for the accuracy and efficiency of the performance of processor 704 and any system(s) based thereupon.

In addition to, as part of, or instead of, any of the filter applications described above, multi-channel audio signals may be generated, such as in applications of smart mixing, as further described herein. An example use case may involve upmixing a two-channel audio signal (e.g., binaural recording, which may have been originally intended for stereophonic playback), so that the two-channel audio may be played over additional channels (e.g., quadraphonic, 7.1 surround, 22.2 surround, etc.).

Rather than copying main stereo channels (left and right) to additional corresponding channels of main audio output on the left and right sides of more complex arrangements of loudspeaker elements, for example, smart upmixing may analyze an audio signal for certain sound elements, e.g., via AI as described elsewhere herein. Additionally, or alternatively, smart downmixing may also be achieved, whereby a multi-channel audio signal may be processed for playback via fewer channels than were originally in the multi-channel audio signal. In some embodiments, an example of smart downmixing may include processing a stereo signal for playback on a single (monophonic) loudspeaker element.

Instead of only superimposing signals and normalizing resulting amplitude, smart downmixing may filter multi-channel audio signals in a way that leverages directivity and/or environmental objects to create an acoustical illusion of multiple loudspeaker elements being present. For example, processor 704 may room modes and/or adapt directivity of an audio output device based at least in part on audio signal input, detected directivity of the audio signal input (or a sample thereof), e.g., via AI techniques, a detected reverberation, echo, or sound reflection, e.g., via an audio input device. As a result of smart downmixing, even a single speaker may be configured to create stereophonic or surround-sound effects as perceived by a listener, binaural recorder, etc.

For audio output device arrangements in which the positioning of loudspeaker elements and/or environmental objects is already known to a content playback system, such as by use of an audio input device at a known location relative to an audio output device, other techniques for upmixing or downmixing may be used. See U.S. patent application Ser. No. 15/915,740, titled "Dynamic Multi-Speaker Optimization," filed Mar. 8, 2018 (now U.S. Pat.

No. 10,158,960); U.S. patent application Ser. No. 16/133,811, titled "Audio Synchronization of a Dumb Speaker and a Smart Speaker Using a Spread Code." filed Sep. 18, 2018; U.S. patent application Ser. No. 16/133,813, titled "Wireless Audio Synchronization Using a Spread Code," filed Sep. 18, 2018; U.S. patent application Ser. No. 16/133,817, titled "Identifying Audio Characteristics of a Room Using a Spread Code," filed Sep. 18, 2018; and Jan Neerbek et al. "Selective Training: A Strategy for Fast Backpropagation on Sentence Embeddings" (PAKDD 2019 LNAI 11441, pp. 40-53); the entireties of which are hereby incorporated by reference herein.

For any channel of a retrieved audio signal, processor 704 may de-correlate certain sound elements identified as described above, e.g., using FIR and/or band-pass filters, or using other pre-separated components (e.g., mixer tracks), to de-couple the certain sound elements from their corresponding audio signals and to play those certain sound elements on designated channels of a more complex arrangement of loudspeaker elements (e.g., surround sound), while playing back any remaining audio component(s) (with or without the certain sound elements) on other available channels. In so doing, processor 704 may create a heightened sense of separation of certain sound elements, which may result in listeners perceiving the sound system (and the sound itself) to be larger than it actually is, and which may also make a room feel more spacious to listeners in a given room containing the sound system used as an audio output device.

An example use case may be to separate voices of talking characters, to play back the voices more loudly from rear speakers in a surround-sound system, while playing sound effects more loudly from front speakers, and playing any musical scores from side speakers, if the content involves a cockpit setting from a first-person perspective, as one example of creating an immersive effect for the viewing audience. In some embodiments, certain types of action scenes may separate reverberations from audio signals, e.g., by deconvolution, and play back the reverberations from rear speakers in a surround-sound system. The reverberations may be played back at higher volumes, with time delay, phase shift, or other effects, depending on desired results for audience experiences.

Any processing for any of 104-108 may be performed by at least one processor 704 on a server device, which may be located in the same room or building as a given playback device or audio output device, or which may be physically located in a remote location, such as in a different facility. e.g., data center, service provider, content distribution network (CDN), or other remote facility, accessible via a local area network (LAN), wide area network (WAN), virtual private network (VPN), the Internet, or a combination thereof, for example. Given that content may be streamed on demand, over computer networks operating in less-than-ideal conditions, another benefit of the techniques of method 100 may include normalizing output in spite of fluctuating input, e.g., unstable audio stream(s) with high or variable latency and/or packet loss, in some embodiments.

Additionally, or alternatively, any processing for any of 104-108 may be performed by at least one processor 704 on a client device, at a client or end-user device (e.g., consumer handheld terminal device such as smartphone, tablet, or phablet; wearable device such as a smart watch or smart visor; laptop or desktop computer; set-top box or similar streaming device; etc.). In some embodiments, any processing for any of 104-108 may be performed by at least one processor 704 communicatively coupled with (including built in with) a loudspeaker element or array thereof, in an audio output device such as at least one "smart speaker" device.

In 110, processor 704 may be configured to transmit the second audio signal to the audio output device. The first audio signal and the second audio signal may be component audio signals of audio playback of the content instance. The first audio signal may be played back simultaneously or near simultaneously with the second audio signal. Alternatively, the second audio signal may be played in sequence following the first audio signal.

Figure 2B:
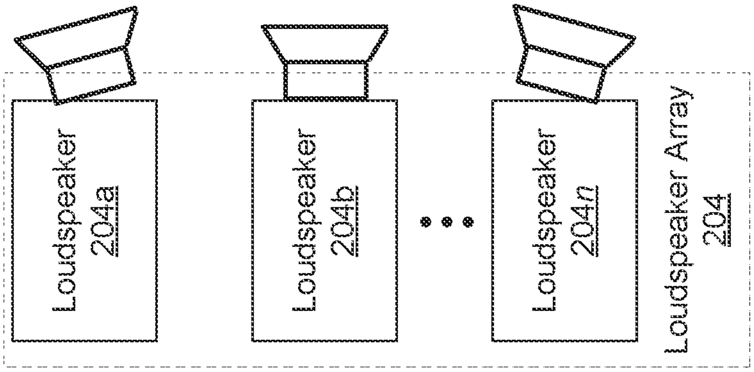
FIGS. 2A and 2B are diagrams illustrating example loudspeaker arrays, according to some embodiments.
Figure 2A:
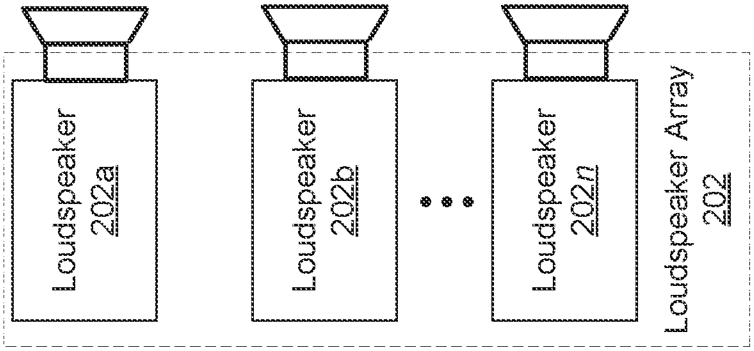

FIGS. 2A and 2B each illustrate example loudspeaker arrays 202 and 204, respectively, according to some embodiments. These loudspeaker arrays may include components other than loudspeaker elements, such as loudspeakers 202*a*-202*n* or 204*a*-204*n*, for example. Loudspeaker arrays 202 or 204, or any component thereof, may further include at least one processor and memory such as those of FIG. 7.

Additionally, any signal input to our output from any components shown in FIG. 2A or 2B may, in some embodiments, be treated as an example of a result of any corresponding step in method 100 implementing enhanced techniques described herein for sound generation with adaptive directivity, for example, which is shown in FIG. 1 as a non-limiting example embodiment of method 100.

Referring to FIG. 2A, loudspeaker array 202 may include any number of loudspeaker elements, including a first loudspeaker 202*a*, a second loudspeaker 202*b*, up to an nth loudspeaker 202*n*, for any arbitrary natural number n. Any individual resource of resources 202 may or may not be considered an independent audio output device, for purposes of array design and implementation. However, in some embodiments, any given loudspeaker element may be configured to function independently of any other loudspeaker element and/or to coordinate operation with any other loudspeaker element.

For example, any loudspeaker 202*a*-202*n* in loudspeaker array 202 may be communicatively coupled with any number of amplifiers in any number of stages, which may be independent of other loudspeakers or shared in common with at least one other loudspeaker. Specifically for FIG. 2A, loudspeakers 202*a*-202*n* in loudspeaker array 202 are shown as having a flat arrangement, in that each loudspeaker 202*a*-202*n* in loudspeaker array 202 is shown in a parallel configuration in the same plane. Even in this configuration of the flat arrangement, enhanced techniques as described herein may create adaptive directivity of the array to improve listener experience in response to desired characteristics of audio signals to be output and/or in response to acoustic characteristics of a room containing loudspeaker array 202, for example.

Spacing between the first loudspeaker 202*a* and the last loudspeaker such as the nth loudspeaker 202*n*, or a loudspeaker on an opposite end of loudspeaker array 202, in some embodiments, may determine a distance or separation value characteristic to the loudspeaker array 202. However, when applying enhanced techniques described herein for sound generation with adaptive directivity, a listener may perceive sound output from the loudspeaker array 202 as having a greater distance or separation between loudspeakers 202*a* and 202*n*, effectively creating a subjectively "bigger" sound.

Referring to FIG. 2B, loudspeaker array 204 may include any number of loudspeaker elements, including a first loudspeaker 204*a*, a second loudspeaker 204*b*, up to an nth loudspeaker 204*n*, for any arbitrary natural number n. Any individual resource of resources 204 may or may not be considered an independent audio output device, for purposes of array design and implementation. However, in some embodiments, any given loudspeaker element may be configured to function independently of any other loudspeaker element and/or to coordinate operation with any other loudspeaker element.

For example, any loudspeaker 204*a*-204*n* in loudspeaker array 204 may be communicatively coupled with any number of amplifiers in any number of stages, which may be independent of other loudspeakers or shared in common with at least one other loudspeaker. Specifically for FIG. 2B, loudspeakers 204*a*-204*n* in loudspeaker array 204 are shown as having an angled arrangement.

Accordingly, in loudspeaker array 204, any given loudspeaker element may be configured to have at least one loudspeaker element oriented at a different angle (in a non-parallel plane) from at least one other loudspeaker element in the array. Thus, for an array of loudspeakers as an audio output device, directivity of the array may depend on position of each loudspeaker (relative position or separation), angles of loudspeaker axes, and sound power output of each loudspeaker in the array, for example.

Further, in some embodiments of loudspeaker array 204, the angle(s) at which loudspeaker elements may be arranged with respect to each other may be fixed or variable. For example, any loudspeaker 204*a*-204*n* in loudspeaker array 204 may be mounted on a movable or motorized platform that may be configured to rotate in response to an electronic or programmatic signal, e.g., by means of a servo or stepper motor (not shown). Angle adjustments may be made by moving a given loudspeaker entirely, or by moving any element thereof, such as a driver element, a horn element, or any part of a horn, for example, which may be folded, angled, stepped, divided, convoluted, etc.

Figure 3:
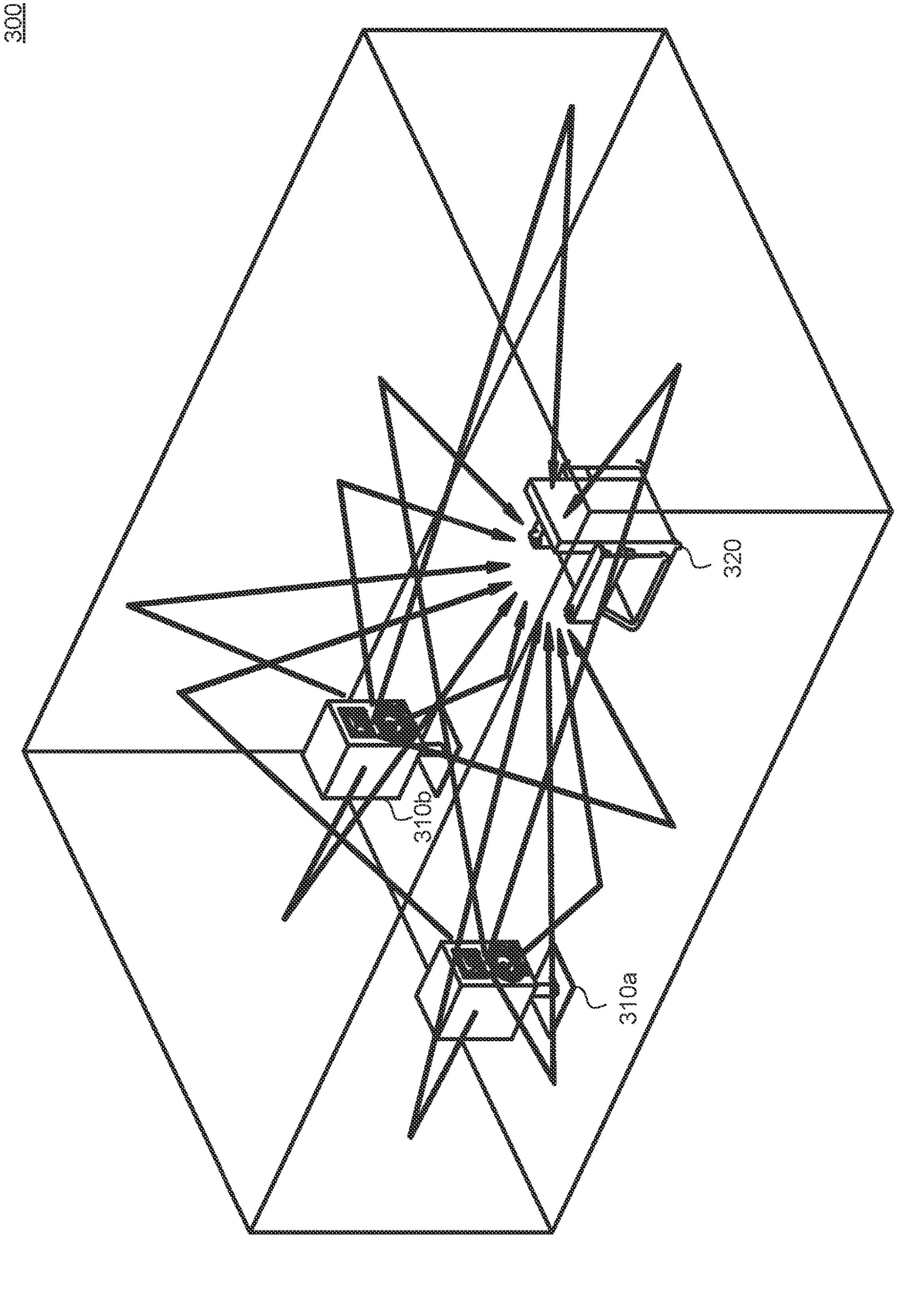
FIG. 3 is a diagram illustrating an example of wet sound, according to some embodiments.

FIG. 3 is a diagram illustrating an example of wet sound, according to some embodiments.

More specifically, FIG. 3 depicts a room 300, which further includes a floor, a ceiling, and a plurality of walls. However, in some embodiments, wet sound may be realized without requiring room 300 to be fully enclosed. For any number of walls in room 300, wet sound may occur even with certain walls being open (e.g., doors, windows, etc.) or nonexistent. A ceiling is also optional, in some embodiments. The depiction of room 300 in FIG. 3 includes four walls and a ceiling for illustrative purposes only, to show reflections of linear paths that sound waves may follow.

Room 300 may contain any number of audio output devices 310, including loudspeakers or loudspeaker arrays. FIG. 3 shows two audio output devices, 310*a* and 310*b*, for illustrative purposes, and is not intended to limit the scope of this disclosure. Room 300 may additionally contain any number of listeners 320. FIG. 3 shows a chair to symbolize listener 320, but a listener 320 may be, in practice, a human listener, e.g., having two ears separated by the lateral width of the human listener's head, for example.

In some embodiments, such as to test audio output device 310 configurations, listener 320 may include at least one microphone, transducer, or other audio input device. Further embodiments may include a dummy head or other binaural recording device, which may include two microphones or transducers separated by the lateral width of a dummy head, which may be comparable to a given human head, and may be composed of materials also having acoustic properties similar to those of the given human head.

In some embodiments, listener 320 may be an audio input device as described above, which may additionally or alternatively include at least one microphone or other transducer apparatus communicatively coupled with at least one processor 704 to provide informational feedback or other acoustical measurements of room 300, which may be used to calculate directivity coefficients, adapt directivity of any audio output devices 310 in room 300, provide crowdsourcing data points, or for other purposes relating to method 100 and/or other enhanced techniques described herein, for example.

In some embodiments, listener 320 may be a group of humans, where the listening experience is improved for multiple participants in the group, for example.

Referring to the arrows in FIG. 3, for illustrative purposes, these arrows show a random sampling of select sound-wave trajectories for some sound waves that reach listener 320. FIG. 3 does not depict all sound waves that reach listener 320, let alone all sound waves emitted by audio output devices 310*a* or 310*b*, which may effectively fill all space of room 300 occupied by a given transmission medium (e.g., air) for wet sounds.

For illustrative purposes, assuming that audio output devices 310*a* and 310*b* are basic loudspeakers or loudspeaker arrays with relatively low directivity coefficients, audio output devices 310*a* and 310*b* may be configured to generate stereophonic audio output for a given input audio signal. Given the low directivity coefficient of the speakers and the reflective properties of room 300, sound waves from the audio output reflect off walls, floor, and ceiling of room 300 (as shown by angled bends of the arrows in FIG. 3) to reach listener 320 from many directions. This effect may cause listener 320 to perceive a rich, voluminous sound.

Similarly, for any given loudspeakers as audio output devices 310*a* and 310*b*, an input audio signal generally associated with wet sound, e.g., a recording of rock concert, may be played back as stereophonic audio output. While sound waves from the stereophonic audio output may retain some properties of the wet sound shown in FIG. 3, audio output devices 310 having higher (or heightened) directivity coefficients (and/or dry filtered input audio signals) may produce a more dry sound, as shown in FIG. 4 and described further below.

In some embodiments, wet sound may also be achieved via filtering of input audio signals irrespective of the physical directivity coefficients of audio output devices 310. Thus, computational logic, which may include, e.g., AI and ML techniques such as those described elsewhere in this disclosure, may be used to recognize wet or dry sounds in audio signals and transform the audio signals and/or how resultant audio output is perceived by listener 320, so as to make a dry sound sound like a wet sound, or vice-versa, for example.

Thus, in an embodiment where room 300 already has reflective qualities, and an indication of these qualities is an input to the computational logic, then the computational logic may reduce or eliminate any processing configured to add any reverberation or echo to make audio output sound wet, and may further introduce processing to make audio output sound more dry, so as to compensate for the reflective properties of room 300.

Figure 4:
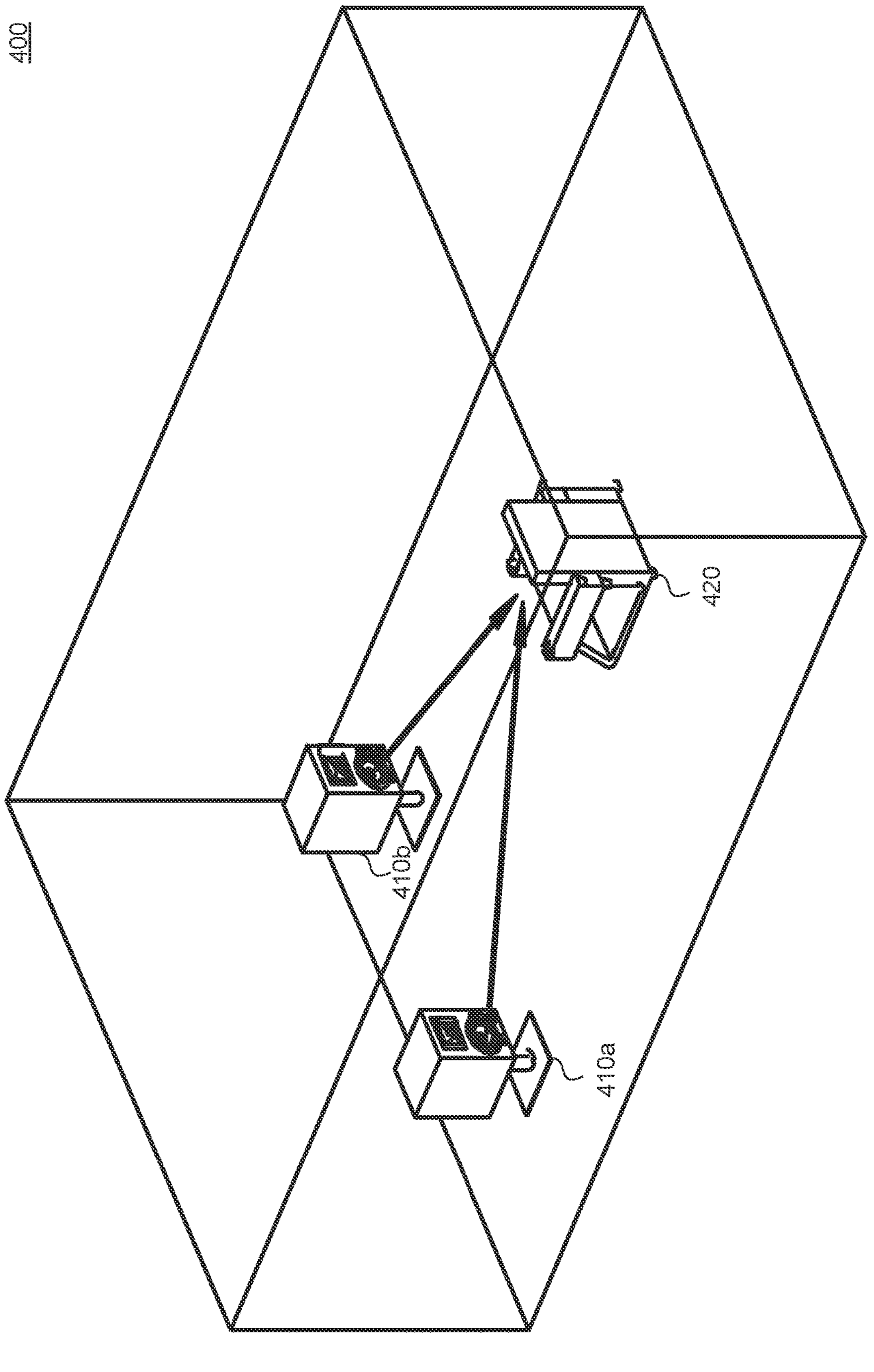
FIG. 4 is a diagram illustrating an example of dry sound, according to some embodiments.

FIG. 4 is a diagram illustrating an example of dry sound, according to some embodiments.

More specifically. FIG. 4 depicts a room 400, which further includes a floor, a ceiling, and a plurality of walls. However, in some embodiments, dry sound may be realized irrespective of room 400, although dry sounds may be strengthened (kept dry) in embodiments where room 400 has fewer reflective surfaces, floor, ceiling, or walls being open (e.g., doors, windows, etc.) or nonexistent, and/or covered in non-reflective or absorptive material(s) or structure(s) to dampen sound reflection. Further ensuring dry sound, room 400 may be an anechoic chamber, in some embodiments.

Room 400 may contain any number of audio output devices 410, including loudspeakers or loudspeaker arrays. FIG. 4 shows two audio output devices, 410*a* and 410*b*, for illustrative purposes, and is not intended to limit the scope of this disclosure. Room 400 may additionally contain any number of listeners 420. FIG. 4 shows a chair to symbolize listener 420, but a listener 420 may be, in practice, a human listener, e.g., having two ears separated by the lateral width of the human listener's head, for example.

In some embodiments, such as to test audio output device 410 configurations, listener 420 may include at least one microphone, transducer, or other audio input device. Further embodiments may include a dummy head or other binaural recording device, which may include two microphones or transducers separated by the lateral width of a dummy head, which may be comparable to a given human head, and may be composed of materials also having acoustic properties similar to those of the given human head.

In some embodiments, listener 420 may be an audio input device as described above, which may additionally or alternatively include at least one microphone or other transducer apparatus communicatively coupled with at least one processor 704 to provide informational feedback or other acoustical measurements of room 400, which may be used to calculate directivity coefficients, adapt directivity of any audio output devices 410 in room 400, provide crowd-sourcing data points, or for other purposes relating to method 100 and/or other enhanced techniques described herein, for example.

In some embodiments, listener 420 may be a group of humans, where the listening experience is improved for multiple participants in the group, for example.

Referring to the arrows in FIG. 4, for illustrative purposes, these arrows show a random sampling of select sound-wave trajectories for some sound waves that reach listener 420. FIG. 4 does not depict all sound waves that reach listener 420, let alone all sound waves emitted by audio output devices 410*a* or 410*b*.

For illustrative purposes, assuming that audio output devices 410*a* and 410*b* are basic loudspeakers or loudspeaker arrays with relatively high directivity coefficients, audio output devices 410*a* and 410*b* may be configured to generate stereophonic audio output for a given input audio signal. Given the high directivity coefficients of the speakers, any amount of reverberation or echo perceived by listener 420 may be relatively low, although subject to the reflective properties of room 400. The effect of a dry sound may cause listener 420 to perceive a direct, plain, and/or close-up sound.

Similarly, for any given loudspeakers as audio output devices 410*a* and 410*b*, an input audio signal generally associated with dry sound, e.g., a recording of violin solo, may be played back as stereophonic audio output. While sound waves from the stereophonic audio output may retain some properties of the dry sound shown in FIG. 4, audio output devices 310 having lower (or lowered) directivity coefficients (and/or wet filtered input audio signals) may produce a more wet sound, as shown in FIG. 3 and described further above.

In some embodiments, dry sound may also be achieved via filtering of input audio signals irrespective of the physical directivity coefficients of audio output devices 410. Thus, computational logic, which may include, e.g., AI and ML techniques such as those described elsewhere in this disclosure, may be used to recognize wet or dry sounds in audio signals and transform audio signals and/or how resultant audio output is perceived by listener 420, so as to make a wet sound sound like a dry sound, or vice-versa, for example.

Thus, in an embodiment where room 400 already has absorptive or non-reflective qualities, and an indication of these qualities is an input to the computational logic, then the computational logic may reduce or eliminate any processing configured to dampen or remove any reverberation or echo to make audio output sound dry, and may further introduce processing to make audio output sound more wet, so as to compensate for the absorptive or non-reflective properties of room 400.

Figure 5:
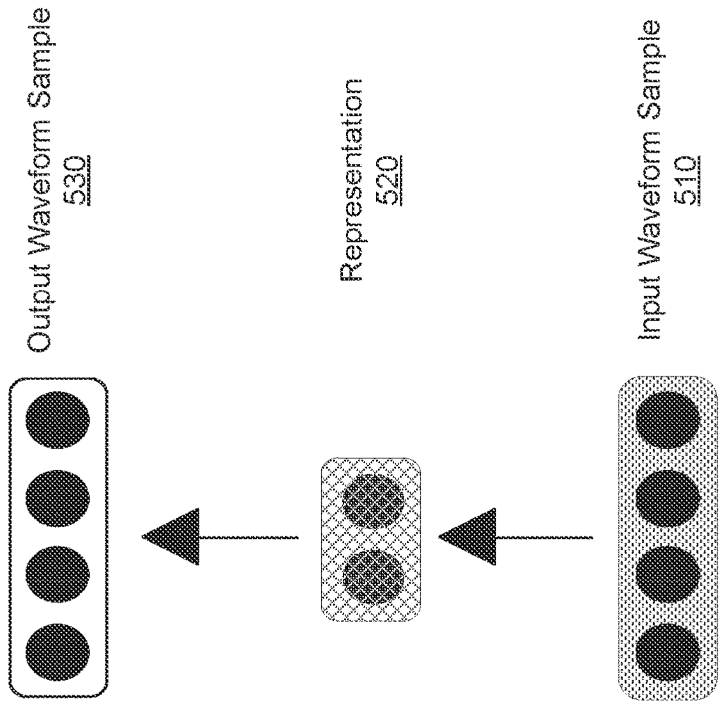
FIG. 5 is a diagram illustrating an example of an autoencoder, according to some embodiments.

FIG. 5 is a diagram illustrating an example of an autoencoder 500, according to some embodiments. Autoencoders may include neural networks with unsupervised or self-supervised machine-learning algorithms that may produce target outputs similar to their inputs, e.g., transformed output audio signals based on input audio signals, in some embodiments. Autoencoder transformations may be linear or non-linear, for example ML in autoencoders may learn or be trained using any number of backpropagation techniques available with a given neural-network architecture having at least one latent layer for dimensionality reduction. In some embodiments, latent layers may be fully connected.

Input waveform sample 510 may include part of an audio signal, such as a digitized waveform of a predetermined length or data size, for example. Input waveform samples 510 may be selected uniformly at predetermined intervals from an input audio signal, for example, or may be randomly selected from the input audio signal, in some embodiments. Other sampling methods, e.g., of selecting subsets of an audio signal, may be used for extracting input waveform samples 510 within the scope of this disclosure.

Representation 520 may include an encoding or sparse coding of the input waveform sample 510 that is reduced in dimension, such as by a transformation function, including convolution, contraction, relaxation, compression, approximation, variational sampling, etc. Thus, the transformation function may be a non-linear function, linear function, system of linear functions, or a system of non-linear functions, for example.

Output waveform sample 530 may include a transformation of a corresponding input waveform sample 510. Fidelity of output waveform sample 530 with respect to input waveform sample 510 may depend on a size and/or dimensionality of representation 520. However, output waveform sample 530 may be transformed in a manner suited to facilitate classification, e.g., by a machine-learning classification algorithm, rather than for faithful reproduction of input waveform sample 510 in output waveform sample 530. Classification is discussed further below with respect to 640 and 650 of FIG. 6.

For example, autoencoder 500 may be configured to denoise (reduce noise of) an input waveform sample, in some embodiments. Noise, as described here, may refer to waveform elements that may create ambiguity for an automated classifier, not necessarily entropy per se or any particular high-frequency sound values.

Output waveform sample 530 may be generated from representation 520 by reversing the transformation function applied to input waveform sample 510 to generate representation 520. Reversing the transformation function may further include any modification, offset, shift, differential, or other variation, for example, in decoding (applying the reverse of the transformation function of the encoding above) and/or an input to the decoding (e.g., modified version of representation 520), to increase likelihood of obtaining a result in output waveform sample 530 that may be useful to a later stage of an AI system, such as ML classification, in some embodiments.

Figure 6:
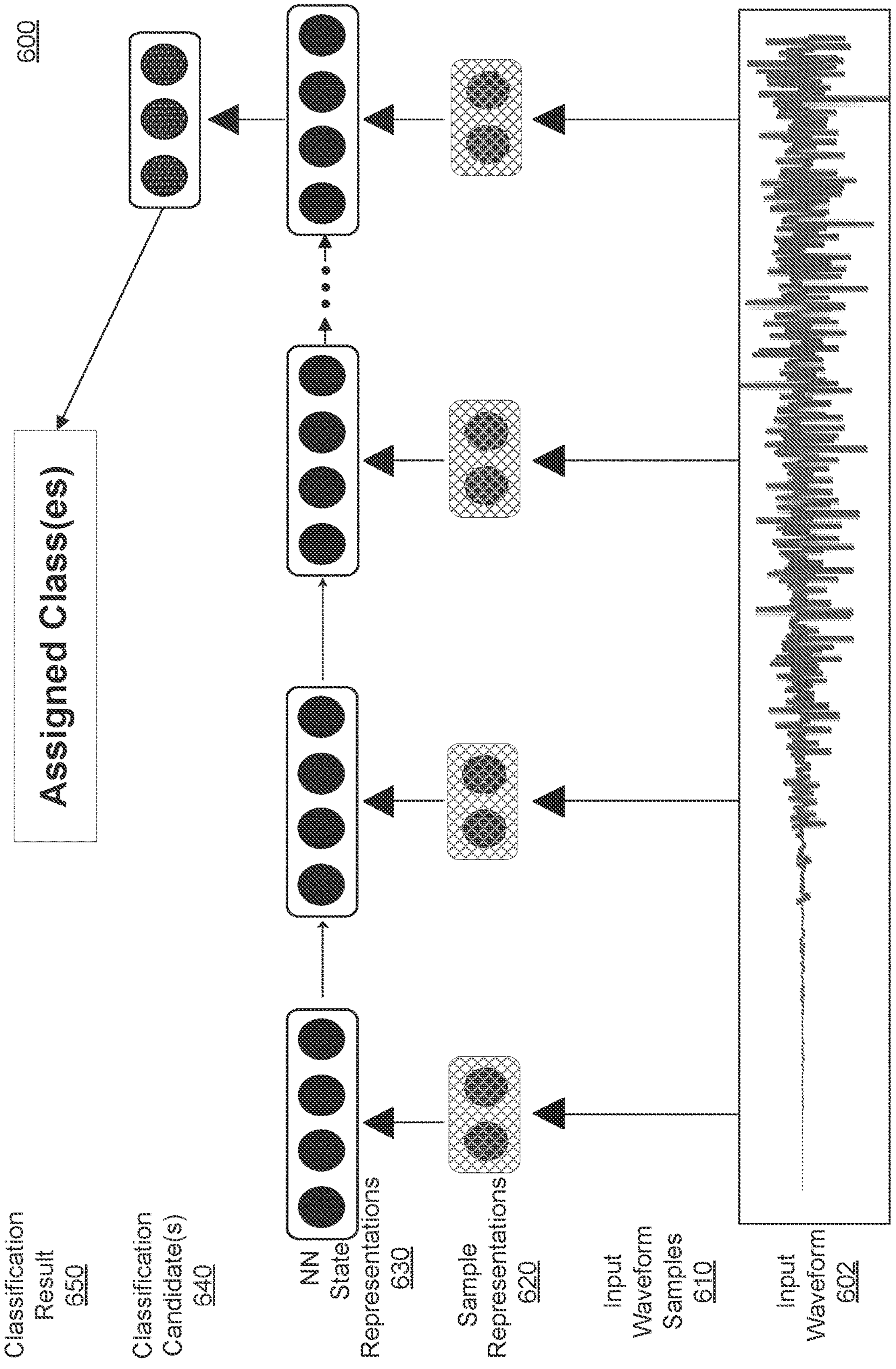
FIG. 6 is a diagram illustrating an example of a deep-learning algorithm, according to some embodiments.

FIG. 6 is a diagram illustrating an example of a deep-learning algorithm, according to some embodiments. Deep-learning architecture 600 shows one example of a multi-layer machine-learning architecture based on stacking multiple ML nodes several layers deep, such that output of one encoder, decoder, or autoencoder, feeds into another encoder, decoder, or autoencoder as input, for example.

While deep-learning architecture 600 of FIG. 6 shows autoencoders as examples of learning nodes, other types of neural networks, perceptrons, automata, etc., may be used in other deep architectures, in some embodiments. As shown in FIG. 6, while some layers of deep-learning architecture 600 may be autoencoders, output from a given autoencoder layer of deep-learning architecture 600 may feed into a classifier to generate at least one classification candidate 640, which may lead to a classification result 650 assigning one or more classes to the corresponding audio signal, e.g., input waveform 602 or corresponding output waveform (not shown).

Input waveform 602 may include an input audio signal or audio sample thereof, which may correspond to a given content instance. Input waveform 602 may include the given content instance in its entirety (e.g., for an audio-only content instance), an audio soundtrack of a multimedia content instance (e.g., presentation, game, movie, etc.), or any subset or combination thereof. In some embodiments, input waveform 602 may be automatically selected by at least one processor, such as processor 704, or may be selected in response to manual input by a user (e.g., viewer, audience member, etc.), to list a few non-limiting examples.

Input waveform samples 610 may correspond to any part of a given input audio signal, such as a digitized waveform of a predetermined length or data size, for example. Input waveform sample 610 may be selected at a predetermined interval from an input audio signal, for example, or may be randomly selected from the input audio signal, in some embodiments. Other sampling methods, e.g., of selecting subsets of an audio signal, may be used for determining input waveform samples 610 within the scope of this disclosure.

Input waveform samples 610 may correspond to different segments or subsets of input waveform 602, for example. In some embodiments, input waveform samples 610 may be copies of the same sample, on which different transformations (or different instances of the same transformation) may be performed to achieve different results (e.g., using variational autoencoders or other autoencoder transformations with random elements), in some embodiments.

Sample representations 620 may include encodings or sparse codings of the input waveform samples 610 that are reduced in dimension, such as by a transformation function, including convolution, contraction, relaxation, compression, approximation, variational sampling, etc. Thus, the transformation function may be a non-linear function, linear function, system of linear functions, or a system of non-linear functions, for example.

Neural-network state representations 630 may include at least one transformation of a corresponding input waveform sample 610. In some embodiments, at least part of an output waveform may be recoverable from a neural-network state representation, but a close correspondence of neural-network state to output waveform may be unneeded in cases where neural networks may be used mainly for classification, for example. With respect to input waveform sample 610, a corresponding neural-network state, as represented by any instance of 630, may depend on a size and/or dimensionality of its corresponding sample representation 620. However, a neural-network state or neural-network state representation 630 may be transformed in a manner suited to facilitate classification, e.g., by a machine-learning classification algorithm, rather than for faithful reproduction of input waveform sample 610 in neural-network state representation 630. Classification is discussed further with respect to 640 and 650 below.

In an embodiment, a deep network of autoencoders, for example, in deep-learning architecture 600 may be configured to denoise (reduce noise of) an input waveform sample, in some embodiments. Noise, as described here, may refer to waveform elements that may create ambiguity for an automated classifier, not necessarily entropy per se or any particular high-frequency sound values.

A neural-network state, or corresponding neural-network state representation 630, may be generated from representation 620 by reversing the transformation function applied to input waveform sample 610 to generate representation 620. Reversing the transformation function may further include any modification, offset, shift, differential, or other variation, for example, in decoding (applying the reverse of the transformation function of the encoding above) and/or an input to the decoding (e.g., modified version of representation 620), to increase likelihood of obtaining a result in neural-network state or neural-network state representation 630 that may be useful to a later stage of an AI system, such as ML classification, in some embodiments, discussed further below with respect to classification candidates 640 and classification result 650, with assignment of at least one class.

Classification candidates 640 may include a selection of one or more classes (categories, tags, labels, etc.) from an available label space (possible classes that can be assigned), and which have not been ruled out by at least one classification algorithm using neural-network state representations 630 as input to a classifier (not shown), whereby the neural-network state representations 630 may be calculated by deep-learning architecture (e.g., deeply stacked autoencoders, per the example shown in FIG. 6) to facilitate automated classification, such as by a machine-learning algorithm.

By having at least one first ML algorithm generate classification candidates 640, subsequent label space for a subsequent classification algorithm (which may be different from the first ML algorithm(s)) may be reduced, which may further improve performance, accuracy, and/or efficiency of the subsequent classification algorithm. In some embodiments, classification candidates 640 may be elided internally by having a classification algorithm configured to generate only one classification result 650, for example.

Classification result 650 may include an assignment of a given audio sample (e.g., input waveform sample 610, neural-network state representation 630, corresponding input waveform 602, and/or corresponding content instance) to one or more classes (categories, labels, tags, etc.) as applicable per algorithmic analysis of deep-learning architecture 600. Classification may be based on the audio input(s) as shown in FIG. 6. In some embodiments, classification may be context-aware and may be influenced by other determinations of simultaneous or near-simultaneous content in parallel media, e.g., video or text, to name a few non-limiting examples.

In some embodiments, processor 704 may automatically determine content of a video clip applying any number of algorithms that may perform image recognition, edge detection, object classification, facial recognition, pose estimation, motion tracking, energy detection, video pattern recognition, heuristic calculation, regression, classification, or other techniques useful to determine content of images or video clips. An algorithm for these use cases may employ any of various heuristics, neural networks, or AI techniques, including computer vision and/or ML, and may further involve deep learning, such as by a parallel deep-learning architecture 600, which may apply similar or different algorithms from those used with processing and classifying waveforms and samples of audio content instances, for example.

Classification may be content-based—in a case of classifying audio samples, audio content of an audio sample may be analyzed. For example, shapes of waveforms, including time-wise progression of frequency, amplitude, dynamic range may be evaluated in a classification algorithm. In some embodiments, pattern recognition, speech recognition, NLP, and other techniques may also be used in classification. An algorithm may employ any of various heuristics, neural networks, or AI techniques, including ML, and may further involve internal processing across a plurality of neural-network layers such as those shown in deep-learning architecture 600 of FIG. 6.

An example use case of detecting video content for audio context may include detection of video images depicting an explosion, which may be characterized by a sudden increase in luminosity and/or colors of a given range of color temperatures or color values, for example, and which may be in certain shapes. Additionally, or alternatively, explosion sounds may be detected via audio characteristics or signatures, including patterns of noise, frequency responses, sudden increases in volume or dynamic range, change in phase structure (e.g., via recursive neural networks), etc. Upon detection of explosion imagery or sound effects, such as by processor 704 applying computer vision and AI techniques, for example, processor 704 may also, in turn, generate an audio signal that may enhance listening viewer's perception of the explosion when audiovisual content corresponding to the explosion recorded therein is played back.

Classification result 650 may further include one or more classes (categories, labels, tags, etc.) assigned to the input waveform 602 or any input waveform samples 610 thereof. The one or more classes may include, in some embodiments, at least one genre, an overall genre, at least one descriptor of audio quality (e.g., wet, dry, pitch, volume, dynamic range, etc.) or crowd-sourced data (e.g., viewer ratings, subjective moods, etc.).

Figure 7:
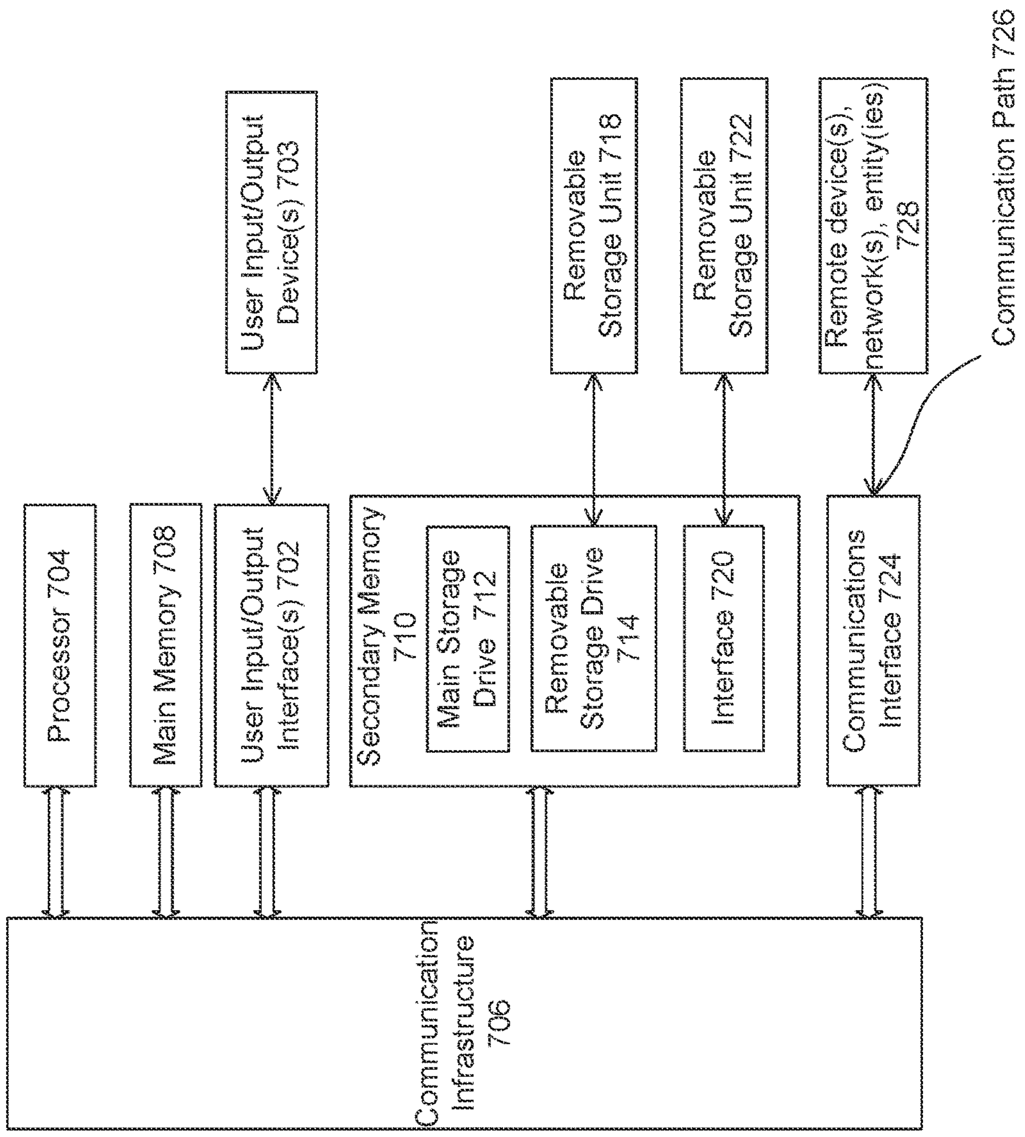
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a bus or communication infrastructure 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography, including brute-force cracking, generating cryptographic hashes or hash sequences, solving partial hash-inversion problems, and/or producing results of other proof-of-work computations for some blockchain-based applications, for example.

Additionally, one or more of processors 704 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or secondary memory 710. Secondary memory 710 may include, for example, a main storage drive 712 and/or a removable storage device or drive 714. Main storage drive 712 may be a hard disk drive or solid-state drive, for example. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communication path 726, which may be wired and/or wireless (or a combination thereof), and which may include any combination of LANs. WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Lua, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

Various programs, libraries, and other software tools may be used for ML modeling and implementing various types of neural networks. Such tools may include TensorFlow, (Py) Torch, Keras, Mallet, NumPy, SystemML, MXNet, OpenNN, Mahout, MLib, Scikit-learn, to name a few non-limiting examples, among other comparable software suites.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments." or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

receiving an audio clip corresponding to a video clip to be output simultaneously, wherein an audio output device is configured to output the audio clip;

detecting a background of the video clip;

determining that the audio clip is to be output with one of wet sounds or dry sounds based on the detected background of the video clip;

configuring the audio clip to enhance the determined one of wet sounds or dry sounds when the audio clip is output; and providing the configured audio clip to the audio output device to audibly output the configured audio clip with the enhanced wet sounds or dry sounds when the video clip is output.

2. The method of claim 1, wherein the determination is that the audio clip is to be output with wet sounds based on the detected background of the video clip, and wherein the configuring comprises increasing one of an echo or reverberation of the audio clip.

3. The method of claim 1, wherein the determination is that the audio clip is to be output with wet sounds based on the detected background of the video clip, and wherein the configuring comprises increasing a bass of the audio clip.

4. The method of claim 1, wherein the determination is that the audio clip is to be output with dry sounds based on the detected background of the video clip, and wherein the configuring comprises deconvoluting the audio clip with its echo.

5. The method of claim 4, wherein the detecting comprises:

detecting that the background comprises an outdoor plains setting.

6. The method of claim 1, wherein the determination is that the audio clip is to be output with dry sounds based on the detected background of the video clip, and wherein the method further comprises:

generating a second audio clip comprising the audio clip deconvoluted with its echo, and wherein the second audio clip is provided to the audio output device in lieu of the configured audio clip.

7. The method of claim 1, wherein the configuring comprises:

determining a number of audio channels associated with the audio signal; and upmixing the audio signal to output the upmixed audio signal over one or more additional audio channels beyond the determined number of audio channels.

8. The method of claim 1, wherein the configuring comprises:

determining a number of audio channels associated with the audio signal; and downmixing the audio signal to output the downmixed audio signal over fewer audio channels than the determined number of audio channels.

9. A system, comprising at least one processor configured to perform instructions, the instructions comprising:

receiving an audio clip corresponding to a video clip to be output simultaneously, wherein an audio output device is configured to output the audio clip;

detecting a background of the video clip;

determining that the audio clip is to be output with one of wet sounds or dry sounds based on the detected background of the video clip;

configuring the audio clip to enhance the determined one of wet sounds or dry sounds when the audio clip is output; and providing the configured audio clip to the audio output device to audibly output the configured audio clip with the enhanced wet sounds or dry sounds when the video clip is output.

10. The system of claim 9, wherein the determination is that the audio clip is to be output with wet sounds based on the detected background of the video clip, and wherein the configuring comprises increasing one of an echo or reverberation of the audio clip.

11. The system of claim 9, wherein the determination is that the audio clip is to be output with wet sounds based on the detected background of the video clip, and wherein the configuring comprises increasing a bass of the audio clip.

12. The system of claim 9, wherein the determination is that the audio clip is to be output with dry sounds based on the detected background of the video clip, and wherein the configuring comprises deconvoluting the audio clip with its echo.

13. The system of claim 12, wherein the detecting comprises:

detecting that the background comprises an outdoor plains setting.

14. The system of claim 9, wherein the determination is that the audio clip is to be output with dry sounds based on the detected background of the video clip, and wherein the instructions further comprise:

generating a second audio clip comprising the audio clip deconvoluted with its echo, and wherein the second audio clip is provided to the audio output device in lieu of the configured audio clip.

15. The system of claim 9, wherein the configuring comprises:

determining a number of audio channels associated with the audio signal; and upmixing the audio signal to output the upmixed audio signal over one or more additional audio channels beyond the determined number of audio channels.

16. The system of claim 9, wherein the configuring comprises:

determining a number of audio channels associated with the audio signal; and downmixing the audio signal to output the downmixed audio signal over fewer audio channels than the determined number of audio channels.

17. A non-transitory computer-readable medium having instructions stored thereon that, when executed by at least one computing device, cause the at least one computing device to perform operations comprising:

receiving an audio clip corresponding to a video clip to be output simultaneously, wherein an audio output device is configured to output the audio clip;

detecting a background of the video clip;

determining that the audio clip is to be output with one of wet sounds or dry sounds based on the detected background of the video clip;

configuring the audio clip to enhance the determined one of wet sounds or dry sounds when the audio clip is output; and providing the configured audio clip to the audio output device to audibly output the configured audio clip with the enhanced wet sounds or dry sounds when the video clip is output.

18. The non-transitory computer-readable medium of claim 17, wherein the determination is that the audio clip is to be output with wet sounds based on the detected background of the video clip, and wherein the configuring comprises increasing one of an echo or reverberation of the audio clip.

19. The non-transitory computer-readable medium of claim 17, wherein the determination is that the audio clip is to be output with wet sounds based on the detected background of the video clip, and wherein the configuring comprises increasing a bass of the audio clip.

20. The non-transitory computer-readable medium of claim 17, wherein the determination is that the audio clip is to be output with dry sounds based on the detected background of the video clip, and wherein the configuring comprises deconvoluting the audio clip with its echo.

* * * * *